March 7, 1961 J. H. WILLIAMS 2,973,667
INDEX MECHANISM
Filed Sept. 4, 1958 2 Sheets-Sheet 1
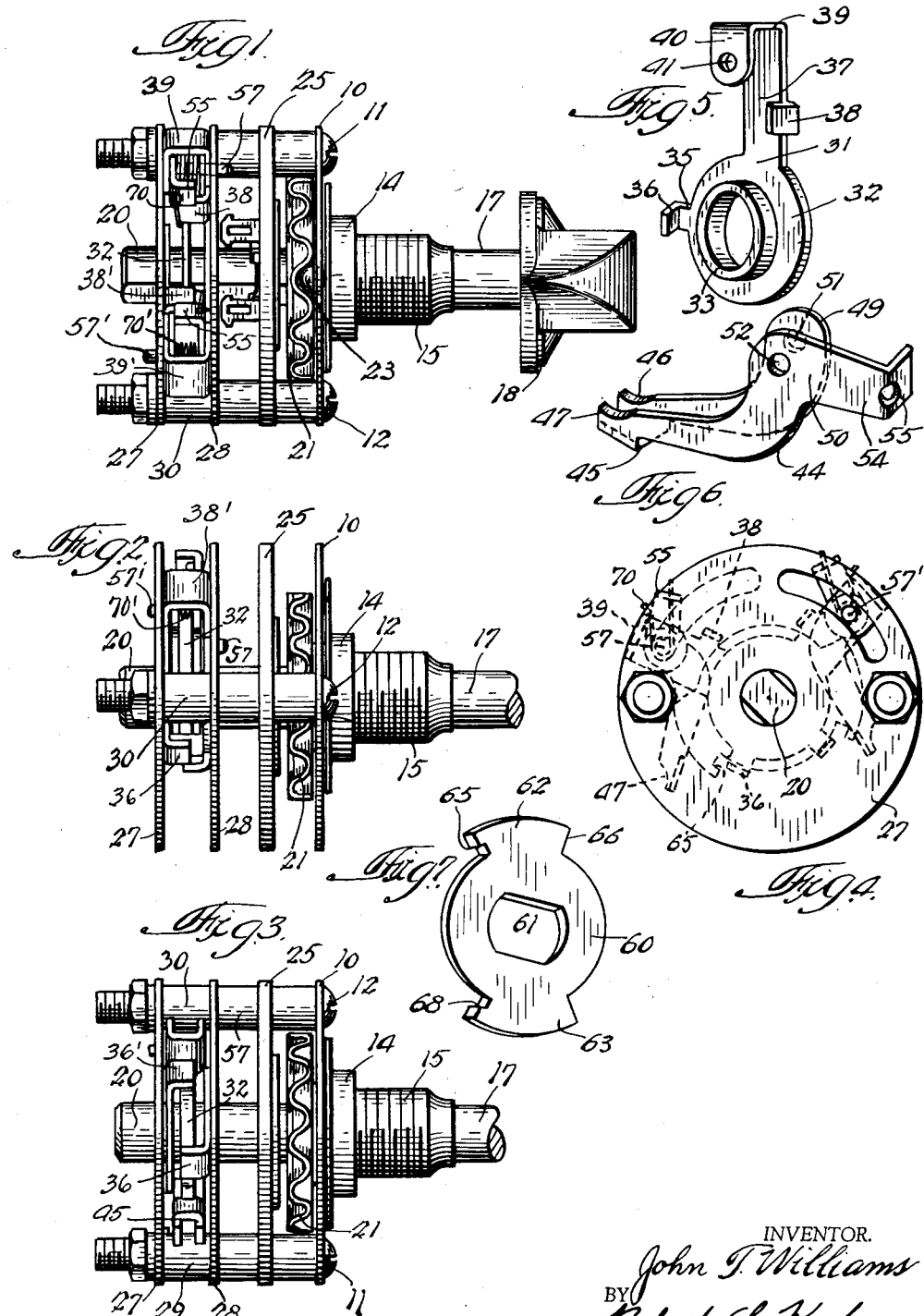
INVENTOR.
John T. Williams
BY Robert L. Kahn March 7, 1961 J. H. WILLIAMS 2,973,667
INDEX MECHANISM
Filed Sept. 4, 1958 2 Sheets-Sheet 2
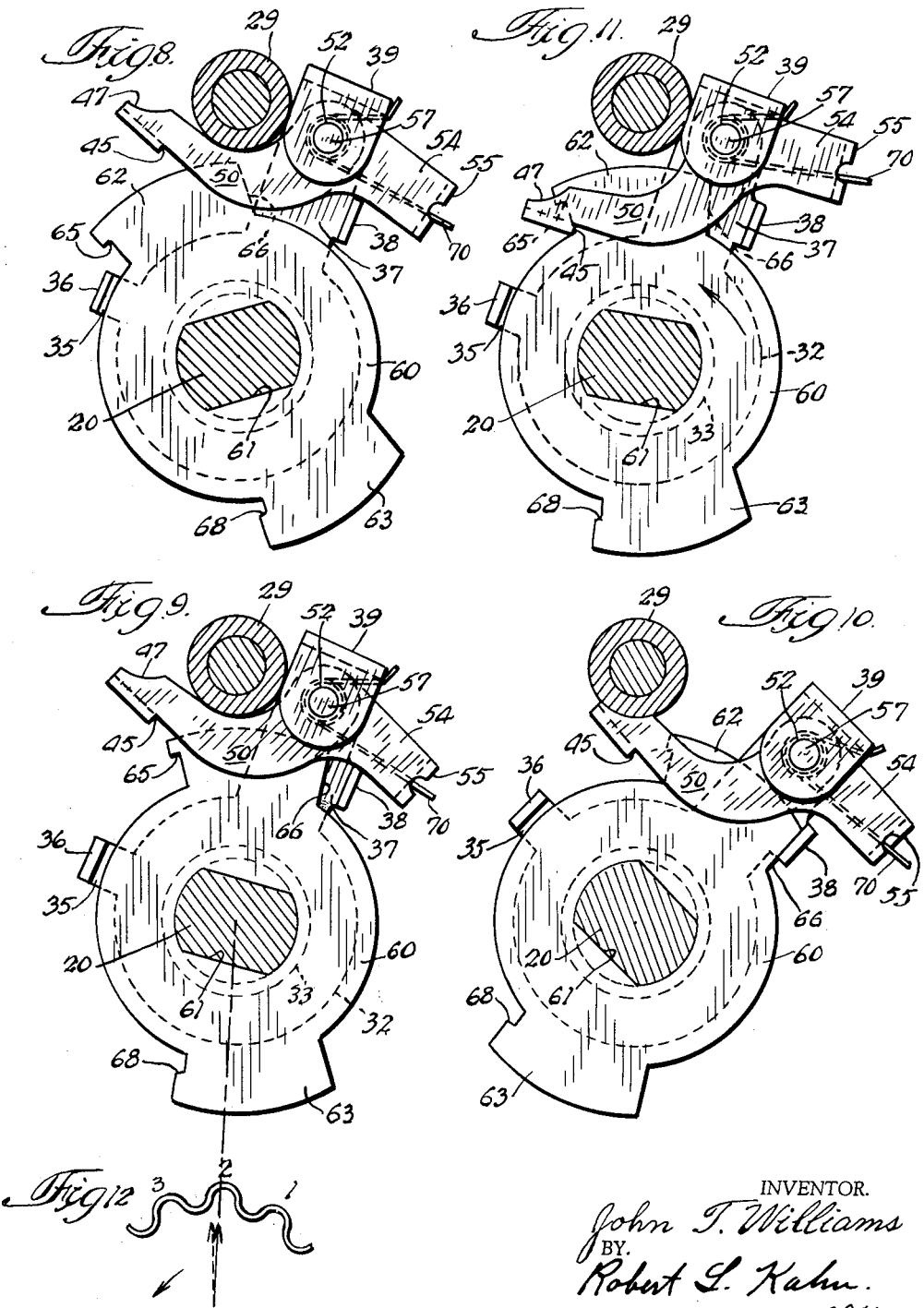
INVENTOR.
John T. Williams
BY
Robert L. Kahn.

United States Patent Office 2,973,667
Patented Mar. 7, 1961

2,973,667
INDEX MECHANISM
John H. Williams, Barrington, Ill., assignor to Oak Manufacturing Co., a corporation of Delaware
Filed Sept. 4, 1958, Ser. No. 759,063
3 Claims. (Cl. 74—565)

This invention relates to a mechanical movement and more particularly to means for preventing the uninterrupted movement in one direction of a part through an index position without stopping. For certain devices, such as for example, electrical switching means, it is desirable to prevent the continuous movement of an operating shaft from one index position through a second index position to a third index position. Thus certain electrical circuits which may have a large number of relays may require a definite time interval to permit resetting of relays for each index position.

The invention to be hereinafter described provides a simple construction for introducing for one direction of movement a delay or stop in an intermediate index position. In order that the invention may be fully understood, reference will now be made to the drawings wherein an exemplary embodiment is illustrated.

Figure 1 is a top plan view of a mechanism embodying the present invention associated with an index means and switching means.

Figure 2 is a side view of the mechanism illustrated in Figure 1 with certain parts broken away.

Figure 3 is a bottom view similar to Figure 2 but showing the parts in a different position.

Figure 4 is an end view of a mechanism embodying the present invention.

Figure 5 is a perspective view of a lever forming part of the mechanism embodying the present invention.

Figure 6 is a perspective view of a pawl used in the new mechanism.

Figure 7 is a perspective view of the cam used in the new mechanism.

Figure 8 is a simplified showing of one portion of the mechanism embodying the present invention, this figure showing the parts in one position.

Figure 9 is a view generally similar to Figure 8 but showing the parts in the next position in an operating cycle.

Figure 10 is a view showing the parts in the third position of an operating cycle.

Figure 11 is a view showing the parts in the final position of an operating cycle.

Figure 12 is a diagram illustrating the operating relationship between an index means and the new movement.

Referring first to Figures 1 to 3 inclusive, there is illustrated one example of an index mechanism which is more fully disclosed in United States Patent No. 2,130,219 issued on September 13, 1938. Briefly, this index mechanism includes plate 10 supported by bolts 11 and 12. Plate 10 carries bushing 14 and threaded sleeve 15 for mounting upon a suitable panel or support. Rotatively secured in bushing 14 is shaft 17 carrying knob 18 at one end thereof.

Shaft 17 has non-circular portion 20 upon which is secured spring index plate 21 whose edge is corrugated as illustrated. Between rotatable index plate 21 and plate 10 is ball bearing 23 normally resting in a suitable well or aperture in plate 10. The aperture in the plate is smaller than the ball diameter so that the ball is retained in position.

Rotation of shaft 17 causes index plate 21 to turn and the spring of plate 21 cooperates with ball bearing 23 to provide an index action. As in all index means, any shaft position off the index for a small angle is an unstable position with the index means tending to move the shaft to the nearest index position.

The index means may be associated with any suitable type of rotary switch means, one section 25 of which is shown as being rigidly clamped between sleeves on bolts 11 and 12. The rotary switch means may assume any one of a number of forms such as, for example, as described in United States Patent No. 2,186,949 issued on January 16, 1940.

The index means illustrated in the drawing ordinarily permits rapid movement through any number of intermediate positions. As previously explained, it may be desirable to provide an operating range of three positions for the switch means and to force the shaft to stop in the middle position at all times before proceeding to the end position. The mechanism forming the subject matter of the present invention performs this function.

The new mechanism is disposed between end plates 27 and 28 carried by bolts 11 and 12. As is well known in this art, the end plates may be maintained in spaced position by means of sleeves 29 and 30. The end plates may have any desired shape, such as for example circular, as illustrated in Figure 4.

All the mechanism embodying the invention is disposed between plates 27 and 28. This mechanism consists principally of a lever illustrated in Figure 5, a pawl illustrated in Figure 6, and a cam illustrated in Figure 7. Before proceeding with the description, it may be observed that one delay unit only operates in one direction and that in order to provide for a delay action in either direction of shaft movement, it is necessary to provide two complete delay units. Inasmuch as the units are generally similar except for the direction of operation, duplicate units will not be described in detail. However, as the description proceeds, the number of individual parts required for a two-unit assembly will be designated.

Member 31 illustrated in Figure 5 comprises hub portion 32 having collar 33 to provide a bearing surface. Member 31 is loose on shaft 20. Hub portion 32 has finger 35 extending radially therefrom, finger 35 having bent portion 36 extending parallel to the axis of the hub. Hub portion 32 also has arm 37 extending radially therefrom at an angle to finger 35. Arm 37 has stop finger 38 extending therefrom. Arm 37 extends beyond finger 38 and terminates in bent U-shaped portion 39 having end portion 40 spaced from and parallel to arm 37. End portion 40 is provided with alined apertures 41 and 42 and is a support portion.

Referring now to pawl 44 illustrated in Figure 6, this comprises U-shaped portion 45 having laterally spaced arm portions 46 and 47 extending parallel to each other to form spaced support portions 49 and 50 provided with alined apertures 51 and 52. Support portion 50 has arm 54 terminating in bent portion 55. The pawl illustrated in Figure 6 is carried by pin 57 passing through lever apertures 41 and 42. Pin 57 works in arcuate slot 58 in plate 28. A companion pawl is carried by pin 57' working in slot 58' in plate 27.

Referring to Figure 7, the cam comprises plate 60 having non-circular aperture 61. Body 60 has two cam extensions 62 and 63 extending from opposite parts thereof. The angular spacing between the two extensions will vary depending upon the angle through which a shaft moves to cover three index positions. As is clearly evident in Figure 7, the extensions are similar.

Cam extension 66 has notched locking edge 65 at one edge of the extension and has stop edge 66 at the other edge of the extension. Extension 63 has its corresponding edges or end portions 68 and 69. It will be noted that notched parts 65 and 68 point toward each other insofar as rotation is concerned. The same is true of stop parts 66 and 69.

In order for pawl 44 to work properly it is essential that the pawl, as illustrated in Figure 6, be biased clockwise around pin 57 passing through apertures 50 and 51 so that U-shaped portion 45 tends to be urged upwardly around pin 57. This biasing may be accomplished by spring 70 coiled around pin 57 and having the ends thereof braced against bent portion 55 of the pawl and U-shaped portion 39 of member 31.

Cooperating with portions 47 and 46 of pawl 44 is one of two sleeves 29 and 30. Sleeve 29 cooperates with one unit and sleeve 30 cooperates with the other unit.

The operation of the mechanism is as follows:

Starting with Figure 8, the shaft is shown in an extreme counter-clockwise position. From this position, the shaft is movable, insofar as the one pawl and cam illustrated are concerned, smoothly without interruption through two index positions as illustrated in Figures 9 and 10 in a clockwise direction. From Figure 10, the shaft is now movable back in a counter-clockwise direction to the intermediate position illustrated in Figure 11. In this intermediate position the pawl and cam shown in this figure cooperate to stop the shaft so long as a counter-clockwise torque is maintained.

In connection with this operation, the locking mechanism requires a reverse movement of the shaft (clockwise in the present instance) to release the lock after which the shaft may continue (counter-clockwise) to the end index position shown in Figure 8. This reverse movement may be obtained by associating the new mechanism with any index means such as, for example, illustrated here. The orientation of an index point or index position with the new mechanism is such that the shaft can go slightly beyond (here counter-clockwise) an index position when it is stopped by the new mechanism. This permits the index means to reverse the shaft back to the index position, through a small angle, such as about five or ten degrees and is sufficient to permit the locking means to unlock and permit the shaft to continue (here in a counter-clockwise direction).

Thus referring to Figure 12 as an example, assume that index positions 1, 2 and 3 have an angular separation of 25°. Index position 1 will be at zero, index position 2 will be at 25° and index position 3 will be at 50°. When going from index position 1 toward 3, it is necessary that the shaft go beyond index position 2 slightly, such as for example 5°, which would make the first travel 30°. The shaft then reverses 5° to go back to 25°, the locking means releases and the shaft continues on to the 50° position. A second unit sharing a cam plate with the first unit for locking the shaft in the reverse direction works in identical fashion. In the reverse direction, the 50° will now be zero and the other values will be correspondingly reversed.

Pawl 44 is in the position illustrated in Figure 8 with the body thereof disposed against sleeve 29. The pawl position is due to the bias imposed by spring 70. The shaft is now turned and causes cam 60 to turn with it.

Assume that the shaft has been turned clockwise to the position shown in Figure 9. The presence of a companion lock unit below the cam does not affect the operation of the unit illustrated here. When the shaft is turned clockwise to the middle index position, the cam is moved clockwise and edge 66 of cam extension 62 will be readied to engage finger 38 of member 31. The position of pawl 44 is still substantially the same as in Figure 8.

Continued clockwise movement of the shaft causes cam plate 60 to move to the position shown in Figure 10. Edge 66 causes member 31 to turn clockwise to the end index position. Curved portions 46 and 47 of the pawl slip under sleeve 29. This represents the extreme clockwise position of the mechanism.

Now assume that the shaft is turned back, counter-clockwise from the end index position to the center index position. During the beginning of this counter-clockwise movement, cam plate 60 moves counter-clockwise. Notched portion 65 of cam extension 62 is so proportioned as to be able to engage part 45 of the pawl and as the cam plate turns toward the position illustrated in Figure 11, notched portion 65 of the cam plate engages the pawl at part 45 and carries it counter-clockwise to the position illustrated in Figure 11. Further movement in a counter-clockwise direction of member 31 from the position shown in Figure 11 is prevented by the engagement of sleeve 29 and portion 39 of member 31.

The position illustrated in Figure 11 for the unit shown is just a bit beyond an index position. Consequently, as the pressure on the shaft is momentarily relieved, the index means turns the shaft clockwise from the position illustrated in Figure 11 just enough for the overhanging part of notched portion 65 to clear portion 45 of the pawl and release the pawl. Upon release of the pawl, shaft 20 can turn cam plate 60 from the position illustrated in Figure 11 to the position illustrated in Figure 8. Member 31 remains in the position shown in Figure 11 although the released pawl is now free to respond to its bias and assume the position illustrated in Figure 8. From the starting position illustrated in Figure 10, member 31 can move only to an intermediate position as illustrated in Figure 11, whereas the shaft and cam plate can continue to the extreme end position illustrated in Figure 8.

The corresponding unit which works with the opposite cam extension functions in the same manner except that the directions are reversed.

Notched part 65 of the cam should be properly proportioned to release the pawl upon the slight reverse movement of the shaft. The position of sleeve 29 is so selected as to permit of the proper rocking of the pawl. Arcuate slots 58 and 58' are long enough to permit pins 57 and 57' to travel over the desired index range but prevent travel much beyond the end index position.

Finger 36 on member 31 may be omitted. It is provided to facilitate assembly of a unit and its installation.

What is claimed is:

1. A delay mechanism for rotary means operating in one direction only and comprising a shaft journalled for rotation, a cam plate rotatably locked to such shaft, said plate having a radial extension provided with a stopping edge and a notched edge, a member loose on said shaft and having a stop finger and a support portion, said support portion being further from said shaft than said stop finger, said stop finger engaging the cam plate stopping edge to provide a detent action for reverse direction at one end of the operating range, a pawl carried by said support portion for pivotal movement around an axis offset from but parallel to said shaft axis and having an arm extending laterally of the pivot axis, said pawl arm engaging the cam plate notched edge when the two are in proper position, means for biasing the pawl so that the pawl arm is clear of said cam plate and rests against a stationary stop, said notched edge of the cam plate constituting the leading edge when the mechanism is being turned in said one direction from said one end of the operating range for delay action; in the shaft starting position, the member stop finger resting on the stopping edge at said one end of the operating range; said cam plate, when turned from the starting position, moving away from the stop finger and the cam plate notched edge, which is the leading edge, engaging the pawl arm in its biased position to force the pawl arm and member carrying the pawl arm to follow the cam plate to an intermediate shaft position, this latter movement of the pawl arm with the shaft causing the pawl arm to move against its bias, said mechanism in this condition being in an intermediate shaft position and requiring relief of torque on said cam plate to permit said cam plate to reverse slightly and permit said cam plate to reverse slightly and permit said pawl arm and notched edge to disengage in response to the pawl arm bias whereupon said pawl and member are free of the cam plate and the cam plate can go further with the notched edge as a leading edge; said support portion of the member cooperating with said stationary stop means to limit the turning of said member in said one direction from its starting position to the shaft intermediate position, said cam plate, when turned in the reverse direction so that the stop edge leads, proceeding smoothly to the shaft intermediate position and picking up the member by engaging the stop finger and going to the one end position in preparation for starting anew.

2. In combination, the delay mechanism according to claim 1 and an index means having three index positions corresponding to the starting intermediate and end positions of said delay mechanism, said delay mechanism having its intermediate position somewhat beyond the index intermediate position so that said delay mechanism is moved backwardly through a slight angle in an intermediate position for operation of said delay mechanism.

3. In combination two mechanisms each corresponding to the mechanism set forth in claim 1 but sharing a cam plate in common, one mechanism being adapted to operate in one direction and the other mechanism being adapted to operate in the reverse direction, the starting position of one corresponding to the end position of the other.

References Cited in the file of this patent

UNITED STATES PATENTS

| | | |
|---|---|---|
| 592,274 | Boening | Oct 26, 1897 |
| 1,708,225 | Kroeger | Apr. 9, 1929 |